(12) United States Patent
Gonsalves et al.

(10) Patent No.: US 8,972,895 B2
(45) Date of Patent: Mar. 3, 2015

(54) ACTIVELY AND PASSIVELY CUSTOMIZABLE NAVIGATION BARS

(75) Inventors: Michael F. Gonsalves, Minneapolis, MN (US); Gregory M. Nations, Minneapolis, MN (US); Chad R. Gourley, Elk River, MN (US); Patricia Korth-McDonnell, Brooklyn, NY (US); Troy Neidermire, Minneapolis, MN (US); Joe Stewart, Brooklyn, NY (US)

(73) Assignee: Target Brands Inc., Minneapolis, MN (US)

( * ) Notice: Subject to any disclaimer, the term of this patent is extended or adjusted under 35 U.S.C. 154(b) by 869 days.

(21) Appl. No.: 12/973,857

(22) Filed: Dec. 20, 2010

(65) Prior Publication Data
US 2012/0159294 A1 Jun. 21, 2012

(51) Int. Cl.
*G06F 3/048* (2013.01)
*G06F 17/30* (2006.01)
*G06Q 30/06* (2012.01)

(52) U.S. Cl.
CPC ...... *G06F 17/30873* (2013.01); *G06Q 30/0601* (2013.01); *G06Q 30/0641* (2013.01)
USPC ............................ 715/825; 715/786; 715/810

(58) Field of Classification Search
USPC ................................. 715/786, 810, 825, 815
See application file for complete search history.

(56) References Cited

U.S. PATENT DOCUMENTS

| | | |
|---|---|---|
| D109,791 S | 5/1938 | Sonin |
| 5,423,139 A | 6/1995 | Feldman |
| 5,530,759 A | 6/1996 | Braudaway et al. |
| 5,644,735 A | 7/1997 | Luciw et al. |
| 5,956,709 A | 9/1999 | Xue |

(Continued)

FOREIGN PATENT DOCUMENTS

| | | |
|---|---|---|
| CA | 2714783 | 6/2011 |
| EP | 2015245 | 1/2009 |

(Continued)

OTHER PUBLICATIONS

Huddleston, Rob, HTML, XHTML, and CSS: Your Visual Blueprint for Designing Effective Web Pages, Jun. 3, 2008, Wiley Publishing, Inc., pp. 15, 34, 53, 138, 158, 164-165, 173-174, 195, 200, 218, 250-251, 306, 355.*

(Continued)

*Primary Examiner* — Kieu Vu
*Assistant Examiner* — Joy M Weber
(74) *Attorney, Agent, or Firm* — Merek, Blackmon & Voorhees, LLC (57) ABSTRACT

A web site user interface for an e-commerce retail company allows a user to easily browse or purchase products or services offered by the company. The web site user interface can include a dual horizontal navigation bar including a main navigation bar and subordinate navigation bar. The subordinate navigation bar can be actively and passively customized. Further, the subordinate navigation bar can include product shipment information in a user specific notification pane. The web site user interface can also include a drop-down logo from the dual parent navigation bar where the web page continues to include the drop-down logo as the user scrolls down to focus on web page content. Alternatively, the web site user interface can include a main navigation bar and secondary navigation bar where the main navigation bar includes fewer subcategories of products than the secondary navigation bar.

25 Claims, 6 Drawing Sheets

(56) References Cited

U.S. PATENT DOCUMENTS

| | | | |
|---|---|---|---|
| D415,483 S | 10/1999 | Decker | |
| 6,014,634 A | 1/2000 | Scroggie et al. | |
| 6,026,376 A | 2/2000 | Kenney | |
| 6,032,130 A | 2/2000 | Alloul et al. | |
| 6,055,573 A | 4/2000 | Gardenswartz et al. | |
| 6,141,666 A | 10/2000 | Tobin | |
| 6,182,871 B1 | 2/2001 | Lam | |
| 6,216,139 B1 | 4/2001 | Liston | |
| 6,298,330 B1 | 10/2001 | Gardenswartz et al. | |
| 6,542,927 B2 | 4/2003 | Rhoads | |
| 6,604,681 B1 | 8/2003 | Burke et al. | |
| 6,766,212 B1 | 7/2004 | Dean | |
| 6,965,376 B2 | 11/2005 | Tani et al. | |
| 7,002,573 B2 | 2/2006 | Trotta et al. | |
| 7,010,876 B1 | 3/2006 | Siegel et al. | |
| 7,055,130 B2 | 5/2006 | Charisius et al. | |
| 7,062,453 B1 | 6/2006 | Clarke | |
| 7,263,499 B2 | 8/2007 | Kunigita | |
| 7,284,206 B2 | 10/2007 | Ozawa et al. | |
| 7,409,362 B2 | 8/2008 | Calabria | |
| 7,503,502 B2 | 3/2009 | Montague | |
| D590,412 S | 4/2009 | Saft et al. | |
| 7,529,797 B2 | 5/2009 | Tseng et al. | |
| D599,373 S | 9/2009 | Kobayashi et al. | |
| 7,603,292 B1 | 10/2009 | Bragg et al. | |
| 7,613,687 B2 | 11/2009 | Nye | |
| 7,643,651 B2 | 1/2010 | Asai | |
| 7,676,387 B2 | 3/2010 | Childress et al. | |
| 7,702,542 B2 | 4/2010 | Aslanian | |
| D619,613 S | 7/2010 | Dunn | |
| D622,280 S | 8/2010 | Tarara | |
| D625,323 S | 10/2010 | Matsushima et al. | |
| D626,133 S | 10/2010 | Murphy et al. | |
| 7,890,378 B2 | 2/2011 | Clarke et al. | |
| 7,996,282 B1 | 8/2011 | Scott et al. | |
| 8,001,003 B1 | 8/2011 | Robinson et al. | |
| D644,663 S | 9/2011 | Gardner et al. | |
| D656,950 S | 4/2012 | Shallcross et al. | |
| 8,244,590 B2 | 8/2012 | Rothman | |
| 8,250,145 B2 | 8/2012 | Zuckerberg et al. | |
| 2001/0029465 A1 | 10/2001 | Strisower | |
| 2002/0046105 A1 | 4/2002 | Gardenswartz et al. | |
| 2002/0165799 A1 | 11/2002 | Jaffe et al. | |
| 2003/0014501 A1 | 1/2003 | Golding et al. | |
| 2003/0050848 A1 | 3/2003 | Defayette et al. | |
| 2005/0040230 A1* | 2/2005 | Swartz et al. | 235/383 |
| 2005/0055321 A1 | 3/2005 | Fratkina et al. | |
| 2005/0081251 A1 | 4/2005 | Walker et al. | |
| 2005/0144093 A1 | 6/2005 | Kassan | |
| 2005/0147054 A1 | 7/2005 | Loo et al. | |
| 2005/0149269 A1 | 7/2005 | Thomas et al. | |
| 2006/0053066 A1 | 3/2006 | Sherr et al. | |
| 2006/0103130 A1 | 5/2006 | Koivukunnas et al. | |
| 2006/0174209 A1* | 8/2006 | Barros | 715/764 |
| 2006/0277103 A1 | 12/2006 | Fujita et al. | |
| 2006/0277477 A1 | 12/2006 | Christenson | |
| 2007/0022020 A1 | 1/2007 | Bernstein | |
| 2007/0078850 A1 | 4/2007 | Aziz et al. | |
| 2007/0095615 A1 | 5/2007 | Spector | |
| 2007/0162850 A1 | 7/2007 | Adler et al. | |
| 2007/0192168 A1 | 8/2007 | Van Luchene | |
| 2007/0226189 A1 | 9/2007 | Piekos et al. | |
| 2007/0244883 A1 | 10/2007 | Bessieres et al. | |
| 2007/0244900 A1 | 10/2007 | Hopkins et al. | |
| 2007/0300261 A1 | 12/2007 | Barton et al. | |
| 2008/0005125 A1 | 1/2008 | Gaedeke | |
| 2008/0077487 A1 | 3/2008 | Davis et al. | |
| 2008/0097844 A1 | 4/2008 | Hsu et al. | |
| 2008/0133500 A1* | 6/2008 | Edwards et al. | 707/5 |
| 2008/0147640 A1 | 6/2008 | Schachter | |
| 2008/0235085 A1 | 9/2008 | Kovinsky et al. | |
| 2008/0255962 A1 | 10/2008 | Chang et al. | |
| 2008/0270248 A1 | 10/2008 | Brill | |
| 2008/0270250 A1 | 10/2008 | Bolivar et al. | |
| 2009/0037355 A1 | 2/2009 | Brave et al. | |
| 2009/0106085 A1 | 4/2009 | Raimbeault | |
| 2009/0106113 A1 | 4/2009 | Arora et al. | |
| 2009/0132388 A1 | 5/2009 | Omori et al. | |
| 2009/0164315 A1 | 6/2009 | Rothman | |
| 2009/0164323 A1 | 6/2009 | Byrne | |
| 2009/0171812 A1 | 7/2009 | Fadell | |
| 2009/0173792 A1 | 7/2009 | Montague | |
| 2009/0199115 A1 | 8/2009 | Singh | |
| 2009/0265968 A1 | 10/2009 | McNamee | |
| 2009/0273612 A1 | 11/2009 | Xie | |
| 2009/0292599 A1 | 11/2009 | Rampell et al. | |
| 2009/0299965 A1 | 12/2009 | Aziz et al. | |
| 2009/0307100 A1 | 12/2009 | Nguyen et al. | |
| 2009/0313117 A1 | 12/2009 | Hu | |
| 2010/0114720 A1 | 5/2010 | Jones et al. | |
| 2010/0179876 A1 | 7/2010 | Holte | |
| 2010/0186066 A1 | 7/2010 | Pollard | |
| 2010/0198697 A1* | 8/2010 | Brown et al. | 705/14.73 |
| 2010/0223082 A1 | 9/2010 | Becker et al. | |
| 2011/0029368 A1 | 2/2011 | Hsu et al. | |
| 2011/0086702 A1 | 4/2011 | Borst et al. | |
| 2011/0125569 A1 | 5/2011 | Yoshimura et al. | |
| 2011/0153451 A1 | 6/2011 | Bitz et al. | |
| 2011/0173095 A1 | 7/2011 | Kassaei et al. | |
| 2011/0225152 A1 | 9/2011 | Beaudreau et al. | |
| 2011/0302498 A1 | 12/2011 | Gorodyansky | |
| 2012/0001939 A1 | 1/2012 | Sandberg | |
| 2012/0079390 A1 | 3/2012 | Ballagh et al. | |
| 2012/0166945 A1 | 6/2012 | Roberts et al. | |

FOREIGN PATENT DOCUMENTS

| | | |
|---|---|---|
| WO | WO0079446 | 12/2000 |
| WO | WO 01/45020 | 6/2001 |
| WO | WO 01/84447 | 11/2001 |
| WO | WO 02/03268 | 1/2002 |
| WO | WO 2005/066844 | 7/2005 |
| WO | WO 2006/101348 | 9/2006 |
| WO | WO 2007/005431 | 1/2007 |

OTHER PUBLICATIONS

Scott, Bill and Neil, Theresa, Designing Web Interfaces, Jan. 19, 2009, O'Reilly Media, Inc., pp. 147-148, 237.*

Huge, Target Patents, Target Patent Annotations, PowerPoint Slides, Mar. 28, 2011, 35 pages.

Maldonado, Robert T., Letter to Gardella, Greg H., Re: Inventor Declarations from Huge Inventors, Mar. 31, 2011, 2 pages.

Gardella, Greg H., Letter to Robert T. Maldonado, Re: Huge Inventors for Target Brands, Inc. Patent Applications, Apr. 11, 2011, 5 pages.

Amazon, search Results for Columbia 100% cotton Towels, Retneved Aug. 10, 2011 from the Internet at: http://www.amazon.com/gp/search/ref=sr_nr_scat_1 0789941_1n?rh=n%3A10789941 %2Ck%3Acotton+bath+towels &keywords=cotton+bath+towels&ie=UTF8&qid=1312572186 &scn=10789941&h=5ec5aedf63cc88f6e48fda6b27c85681ae7a21ba, 6 pages.

Amazon.com Universal Wish List, [Online]. Dec. 20, 2010, Retrieved from the Internet at: http://www.amazon.com/b/?ie=UTF8 &node=2223317011 &tag=googhydr-20&hvadid=3877744091 &ref=pd_sl_37ck7ovrfc_b, 3 pages.

Bedding & Bath, http:/fvvww.kohls.com/kohlsStore/bedandbath/towels/decorativetowels.jsp?bmForm=guided_nav-search &SubcatFolderiD=2534374752660882, at least as early as Mar. 29, 2011 (2 pages).

Best Buy, Every Day Laptops, [Online], Dec. 13, 2009, Retrieved from the Internet at: http://www.bestbuy.com/site/Laptop-Computers/Everyday-Laptops, 4 pages.

BestBuy, Search Results for iT, Retrieved Aug. 5, 2011 from the Internet at: http:f/www.bestbuy.com/site/olspage.jsp;jsessionid=9B6687FFBB3C82, 8 pages.

Canon Digital Rebel XT Review (www.dcviews.com, Jul. 4, 2007, 5 pages.

Office Action from Canadian Patent Application No. 2.761,936, mailed Jul. 16, 2012 (3 pages).

(56) References Cited

OTHER PUBLICATIONS

Office Action from Canadian Patent Application No. 2.761,936, mailed Nov. 21, 2012 (3 pages).
Office Action from Canadian Patent Application No. 2.761,936, mailed Apr. 18, 2013 (3 pages).
Office Action from Canadian Patent Application No. 2.761,560, mailed Apr. 18, 2013 (3 pages).
Office Action from Canadian Patent Application No. 2,781,784, mailed Nov. 27, 2012 (4 pages).
Eddie Bauer.com,, [Online] Dec. 20, 2010, Retrieved from the Internet at: https://www.eddiebauer.com/checkout/bag.jsp?&categoryId=95&categoryName=SWEATERS-- CARDIGANS &pCategoryId=3&pCategoryName=WOMEN&gpCategoryId=1 &gpCategoryName=EB#ppl=%7Btype%3A%22transition%22%2CensembleId%3A%2236211%22%2CformatStr%3A%22product%22%CpassedId0bj%3A%7B%22ensembleld%22%3A%2236211%22%7D%Ccategory%3A%2227411%22%2CpathInfo%3A%22undefined%.
Etihad Airways Home Page, Retrieved Aug. 10, 3011 from the Internet at: http://www.etihadairways.com/sites/etihad/us/en/home/pages/home.aspx?cid=ppc_start, 1 page.
Facebook Adds Profile Preview Feature [Online], Jan. 7, 2010, Retrieved from the Internet at: http://www.allfacebook.com/facebook-adds-profile-preview-feature-2008-09, 5 pages.
Facebook Developers Facebook Connect, Build and grow with Facebook Connect, [Online] Dec. 18, 2009, Retrieved from the Internet at: http://developers.facebook.com/connecl.php, 2 pages.
Google Product search results for "Canon Powershot", Retrieved Mar. 5, 2010 from the Internet at: http://www.google.com/products?q=canon+powershot&aq=O&oq=canon+p, 3 pages.
HP Support, Search Results for "HP Pavilion dv7t-1 000" I FAQ, Retrieved Mar. 25, 2010 from the Internet at:http://h10061.www1.hp.com/ccsearch/search?pname=H P+Pavilion+dv7t-1000+CTO+Ent, 1 page.
Han, Taedong, Exploring Price and Product Information Search Behavior in e-Market, Proceedings of the International Conference on Information Technology: Coding and Computer, Mar. 2005, 6 pages.
Just-Style: connecting to consumers, [Online], Sep. 16, 2002, Retrieved from the Internet at: http://www.just-style.com/articleprinl.aspx?id=93012 on Dec. 19, 2009, 4 pages.
Kitchen & Dining, http://fvvww.amazon.com/kitchen-dining-small-appliances-cookware/b?ie=UTF8&node=284507, at D/S.L./ least as early as Jan. 28, 2011 (3 pages).
Kohls [Online], Dec. 20, 2010, Retrieved from the Internet at: http://www.kohls.com/upgrade/webstore/home.jsp; jsessionid=3cSgNPp TqV8tRh32vBzDf2q 12xQJzpWQjD5Mpnrqlp3wtMX81Psn!-17 48685949! 105707934, 2 pages.
Kohls, Search Results for "bath towel", Retrieved Aug. 5, 2011 from the Internet at: http://www.kohls.com/upgrade/webstorelhome.jsp;jsessionid=2W1QTB, 3 pages.
Lin, Wen-Shan et al., Understanding Consumer Search Activity and Online Purchase Intensions for Improving the Product Recommendation Search, 6th IEEE/ACIS International Conference on Computer and Information Science, D, Apr. 2007, 6 pages.
Logictech Mouse Home Page, Retrieved Aug. 10, 2011 from the Internet at: http://www.logitech.com/en-us/mice-pointers/mice, 13 pages.
OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.
"Priceless Promotions," by Samantha Murphy, Chain Store Age 84. 10 (Oct. 2008): 58.
"Processors-Desktops," http ://fvvww. neweg g. com/Store/SubCategory .aspx? SubCategory=34 3&nam e= Processors- Desktops, at least as early as Dec. 30, 2010 (1 page).
Sony Notebook Home Page, Retrieved Aug. 10, 2011 from the Internet at: http://store.sony.com/webapp/wcs/stores/servlet!CategoryDisplay?catalogId= 1 0551 &storeId= 1 0151 &langId=-1 &categoryId= 16154&SR=nav: electronics: computers:laptops:shop_compare:ss&ref=http%3A%2F%2Fwww.sony.com%2Findex.php, 5 pages.
Sonystyle, [Online], Dec. 13, 2009, Retrieved from the Internet at: http://www.sonystyle.com/webapp/wcs/stores/servlet/StoreCatalogDisplay?langId=- 1&storeId=10151 &catalogId=10551&eid=372683003, 2 pages.
Tom's Hardware Home Page, Tom's Hardware: Hardware News, Tests and Reviews, Retrieved Mar. 4, 2010 from the Internet at:: http://www.tomshardware.com/us/#redirect, 3 pages.
Jan. 28, 2013 Office Action, U.S. Appl. No. 12/973,651.
Mar. 18, 2013 Office Action, U.S. Appl. No. 12/887,098.
BabiesRus, Baby Gifts—Baby Registry at BabiesRus, [Online], Dec. 20, 2010, Retrieved from the Internet at: http://www.toysrus.com/registry/index.jsp, 1 page.
Crate&Barrel, [Online], Dec. 20, 2010, Retrieved from the Internet at: http://www.crateandbarrel.com/gift-registry/, 1 page.
Amazon.com, [Online], Dec. 20, 2010, Retrieved from the Internet at: http://www.amazon.com/gp/wedding/homepage/ref=sv_cm_gft_5, 1 page.
Macy's, [Online], Dec. 20, 2010, Retrieved from the Internet at: http://macys.com/registry/wedding/registryhome, 1 page.
http://www.target.com, Target Brands, Inc. Archived on Jul. 14, 2009 retrieved from web.archive.org/web/20090714060557/http://www.target.com, p. 1-84.
Kalbach, Designing Web Navigation, O'Reily Media, Aug. 2007, pp. 73-74; p. 90.
Meloni, Sams Teach Yourself HTML and CSS in 24 Hours, 8th ed., Sams Publishing, Dec. 2009, p. 361.
Van Duyne et al., The Design of Sites: Patterns for Creating Winning Web Sites, 2nd ed., Prentice Hall, Dec. 14, 2006, p. 677-758.
Cohen, The Unusually Useful Web Book, New Riders Publishing, Jun. 2003, p. 113-114.
Poem entitled "i carry your heart with me (i carry it in," by E.E. Cummings [On-line], Poem dated 1920. Retrieved from Internet 06-03-2-13. URL>http://en.wikipedia.org/wiki/E._E_Cummings<... (12 pages, see p. 5).
Office Action from Canadian Patent Application No. 145,725 mailed Oct. 1, 2012 (1 page).
Steve Eastman Presentation, Target Managers Meeting, Mar. 15, 2010.
TGT—Target Financial Community Meeting, Jan. 21, 2010.
Online Pharmacy for Prescription Drugs—CVS Pharmacy Drug Store [Online], Dec. 21, 2009, Retrieved from the Internet at: http://www.cvs.com/CVSApp/user/home/home.jsp, 2 pages.
Sam's Club, [Online], Dec. 21, 2009, Retrieved from the Internet at: http://www.samsclub.com/shopping/index.jsp, 3 pages.
Organize.com, Kitchen, [Online], Dec. 20, 2009, Retrieved from the Internet at: http://www.organize.com/kitchen.html, 4 pages.
Pet, CSN Stores, [Online], Dec. 20, 2009, Retrieved from the Internet at http://www.csnstores.com/Pet-C216358.html, 2 pages.
Walmart, [Online], Dec. 21, 2009, Retrieved from the Internet at: http://www.walmart.com, 2 pages.
Amazon, Prime Eligible Under $25, [Online], Dec. 19, 2009, Retrieved from the Internet at: http://www.amazon.com/s/Znode=2238906011&field%2dprice=%d2500&p%5f76=1, 4 pages.
Amazon, Recommended for You, [Online], Dec. 21, 2009, Retrieved from the Internet at https://www.amazon.com/gp/yourstore?ie=UTF8&ref_=pd%5Firl%5Fgw, 3 pages.
Grannell, Craig, .net/techniques, /CSS/create a navigation bar, Sep. 2, 2007, 4 pages.
Yahoo! Small Business, Effective Navigation Bar Design, [Online], Dec. 21, 2009, Retrieved from the Internet at: http://smallbusiness.yahoo.com/r-pfp-a-40931-m-6-sc-37-effective_navigation_bar_design.html, 1 page.
Office Action from Canadian Patent Application No. 2,761,556, mailed Aug. 9, 2012 (2 pages).
Office Action from Canadian Patent Application No. 2,761,556, mailed Mar. 22, 2012 (3 pages).
"Sam's Club—samsclub.com", pp. 1-3, Dec. 21, 2009, http://www.samsclub.com/shopping/index.
Cascading Style Sheets, Level 2, CSS2 Specification, May 12, 1998, see http://www.w3.org/TR/1998/REC-CSS2-19980512 (338 pages).

(56) References Cited

OTHER PUBLICATIONS

Cascading Style Sheets, Level 2, CSS2 Specification, May 12, 1998, see http://www.w3.org/TR/1998/REC-CSS2-19980512/visuren.html#q5 (33 pages).

Cascading Style Sheets, Level 2, CSS2 Specification, May 12, 1998, see http://www.w3.org/TR/1998/REC-CSS2-19980512/visudet.html (15 pages).

http://web.archive.org/web/20110102014202/http://www.newegg.ca/Store/Category.aspx? Category=32&name=PowerSupplies, Jan. 2, 2011 (3 pages).

http://www.web.archive.org/web/20111018232514/http://www.newegg.com/Product/Product.aspx? Item=N82E16811112222&cm_sp=Cat_Computer_Cases-_-48_Hr_Sale-_-11-112-222, Oct. 18, 2011 (3 pages).

http://web.archive.org/web/20111020122330/http://www.newegg.com/Special/ShellShocker.aspx? cm_sp=ShellShocker-_-756293-_-10182011_1, Oct. 20, 2011 (2 pages).

http://web.archive.org/web/20111123021727/http://bucarotechelp.com/design/csseasy,91010001.asp, Nov. 23, 2011 (2 pages).

Office Action from Canadian Patent Application No. 2,779,702, mailed May 14, 2014 (8 pages).

HTML 4.01 Specification, W3C Recommendation Dec. 24, 1999, http://www.w3.org/TR/1999/REC-htm1401-19991224/htm/40.txt (332 pages).

"Target" Internet Archive WaybackMachine for http://www.target.com/on on Nov. 29, 2007 (2 pages).

* cited by examiner

ACTIVELY AND PASSIVELY CUSTOMIZABLE NAVIGATION BARS

BACKGROUND

A user interacts with a web browser in order to view web pages on the Internet while searching for information. Web pages include navigation bars that allow the user to access different areas of a web site. Some web pages include navigation bars at the top or the bottom of the web page. Some web pages include vertical navigation bars on the right or left side of the web page.

Search engines allow a user to more easily find the information the user is looking for. A user searches for information relating to products or services in order to find out more about those products or services. The user views buying guides, frequently asked questions (FAQs), and reviews about the products or services they are looking for.

Some web sites allow a user to create a user account. To create an account the user is asked to create a username and password and complete an account profile. A completed account profile includes information such as the user's name, home address, and username for social networking sites. When signed on under their username and password the user can access information including their past purchases, shopping lists, and the shipping status of their past purchases.

Some web pages are customized based on the user's account profile. Customized web pages display user specific information including a user specific welcome message, local store information, product reviews from members of the user's social network, and suggested products based on the user's past purchases.

SUMMARY

In general, a web site user interface for an e-commerce retail company allows a user to easily browse or purchase products or services offered by the company. The web site user interface can include a dual horizontal navigation bar including a main navigation bar and subordinate navigation bar. The subordinate navigation bar can be actively customized by the user or passively customized based on the user's behavior within the web site. Further, the subordinate navigation bar can include product shipment information in a user specific notification pane. The web site user interface can also include a drop-down logo from the dual parent navigation bar where the web page continues to include the drop-down logo as the user scrolls down to focus on web page content. Alternatively, the web site user interface can include a main navigation bar and secondary navigation bar where the main navigation bar includes fewer subcategories of products than the secondary navigation bar.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

In some implementations, a web site user interface includes a horizontal navigation bar on pages associated with the web site. The horizontal navigation bar appears in the same position on a display as the web pages are scrolled down. For example, the horizontal navigation bar remains at the top of the display. The horizontal navigation bar includes a main navigation region and a subordinate navigation region. The main navigation region presents retail product categories and allows easy access to browse products in the product categories. The subordinate navigation region presents subcategories of the product categories.

In some implementations, the subcategories are specified by a user. In some implementations, the subcategories are determined based on a user's browsing or purchasing history. In some implementations, the subcategories are determined based on industry trend behavior. In some implementations, the subordinate navigation region includes information relating to a store a user typically shops at.

In some implementations, a corporate logo related to the e-commerce site is positioned below the horizontal navigation bar. For example, the corporate logo remains in the same position on a display when a user scrolls down a web page that is presenting the horizontal navigation bar and the corporate logo.

In some implementations, a web page presents links to buying guides, FAQs, wedding registries, lists, and help in response to a product search. For example, the search results page includes a link to view a buying guide related to products presented on the search results page.

In some implementations, when a search engine does not find any results for a keyword query, a search results web page presents products similar to the keyword query. For example, an e-commerce search engine receives a query for a specific brand of product. The search engine determines that the e-commerce web site does not carry the specified brand and determines brands that are related to the specified brand. A search results web page presents products or information about the related brands.

Figure 1:
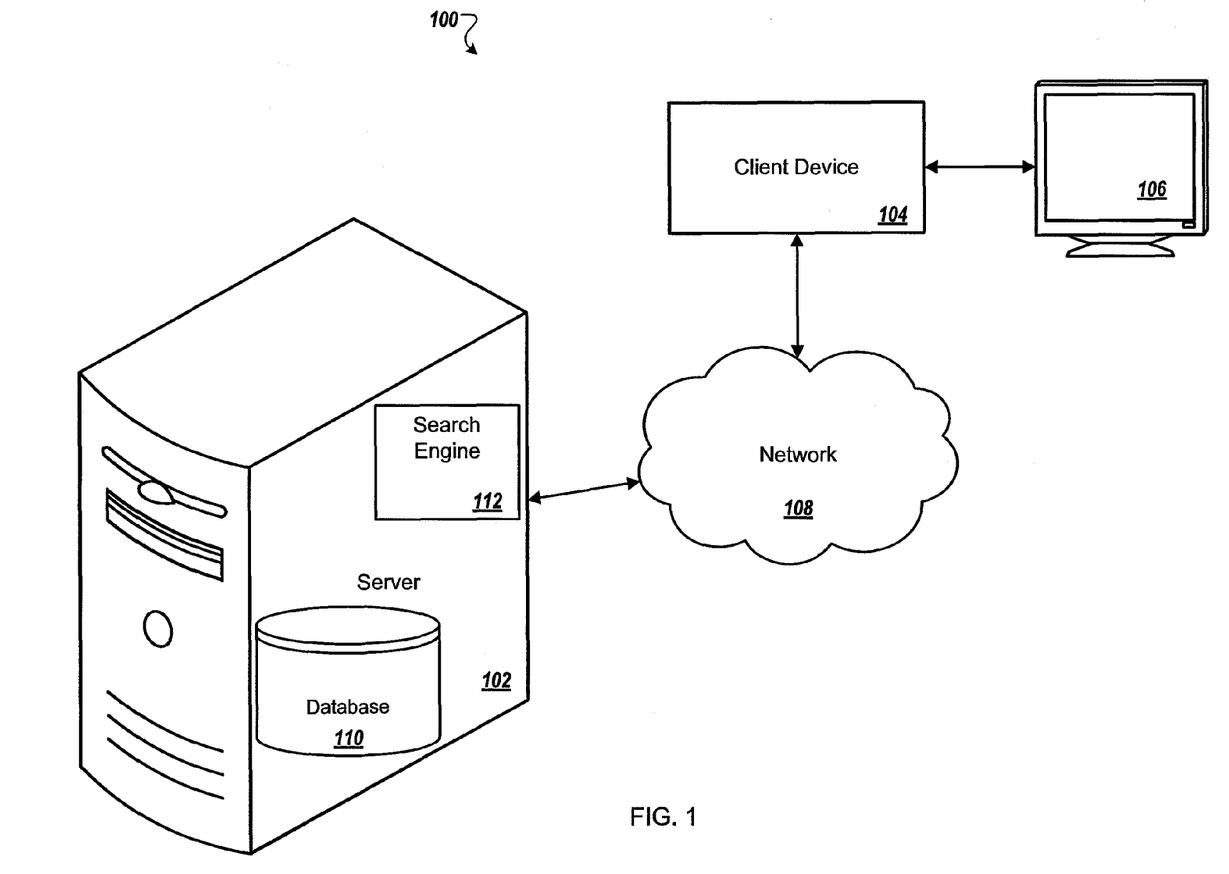
FIG. 1 shows an example of a system for providing web pages to a computing device.

FIG. 1 is an example of a system 100 for providing web pages to a computing device. For example, the computing device requests a web page from a server. The computing device includes or is connected to a display device and presents the web page on the display device for viewing by a user.

The system 100 includes a server 102. The server 102, for example, contains information for an e-commerce company. The server 102 includes a database 110 or file system for storage of product information. For example, the server 102 stores information relating to web pages. The web pages are related to products or services offered by the e-commerce company. For example, the web pages include information about products sold by the e-commerce company. In some implementations, the web pages include information about the e-commerce company, information about products and services offered for free, buying guides, FAQs, or help information.

A client device 104 requests web pages from the server 102 for presentation to a user. For example, the client device 104 presents web pages in a browser on a display 106. The client device 104 receives input from a user directing the client device 104 to a specific e-commerce web site. For example, a browser receives a Uniform Resource Locator (URL) address from the user.

In some implementations, the client device 104 receives a query from the user and sends the query to the server 102. For example, the query is for products or services offered by the e-commerce company. A search engine 112 included on the server 102 processes the search query and determines product results related to the search query located on the database 110. The server 102 creates a web page with the query results and provides the web page to the client device 104. The client device 104 presents the web page on the device 106.

In some implementations, the client device 104 is a desktop computer and the display 106 is a liquid crystal display (LCD). The client device 104 is alternatively a laptop, tablet PC, smartphone, or a server. In some implementations, the display 106 is built into the client device 104. For example, the display 106 is a screen in a smartphone or a laptop.

In some implementations, the search engine 112 searches for non-product information related to a user search query. For example, the search engine 112 searches wedding registries, lists, buying guides, FAQs, or help for information related to the search query. A search results page provided to the client device 104 includes links to web pages with the related information.

A web page provided by the server 102 includes a horizontal navigation bar at the top of the web page. A main navigation region of the horizontal navigation bar presents product category information. For example, the main navigation region includes links to product categories offered by the e-commerce company. In some implementations, the main navigation region includes a search box. In some implementations, the main navigation region includes user specific information. For example, the main navigation region includes a welcome message for a user, a link to access user account settings, or a link to logout of the web site.

The horizontal navigation bar includes a subordinate navigation region. The subordinate navigation region includes links to subcategories associated with products or services offered by the e-commerce company. For example, the subcategories are user specified or determined by the e-commerce company. In some implementations, the maximum number of subcategories presented on a web page is predetermined (e.g., by the e-commerce company). In some implementations, the number of subcategories presented on a web page is determined by the size of the display 106. For example, a display with a high resolution (e.g., a resolution of 1900×1200a) presents a web page with more subcategories than a display with a lower resolution (e.g., 800×600).

In some implementations, the horizontal navigation bar appears at the top of the display 106 when presented in a browser. In some implementations, the horizontal navigation bar is fixed in a static position on the display 106 and when a web page presenting the horizontal navigation bar is scrolled down the horizontal navigation bar remains in the same position on the display 106.

In some implementations, an image comprising a corporate logo, name or symbol is presented adjacent to the horizontal navigation bar. For example, when a page presenting the image is scrolled down, the image remains in the same position on the display 106.

The client device 104 connects to the server 102 through a network 108.

For example, the network 108 is a local area network, a wide area network, or the Internet. The client device 104 connects to the network 108 with a cable. In some implementations, the client device 104 connects to the network 108 wirelessly, e.g., with Bluetooth, IEEE 802.11, radio frequency, or a cellular network.

Figure 2A:
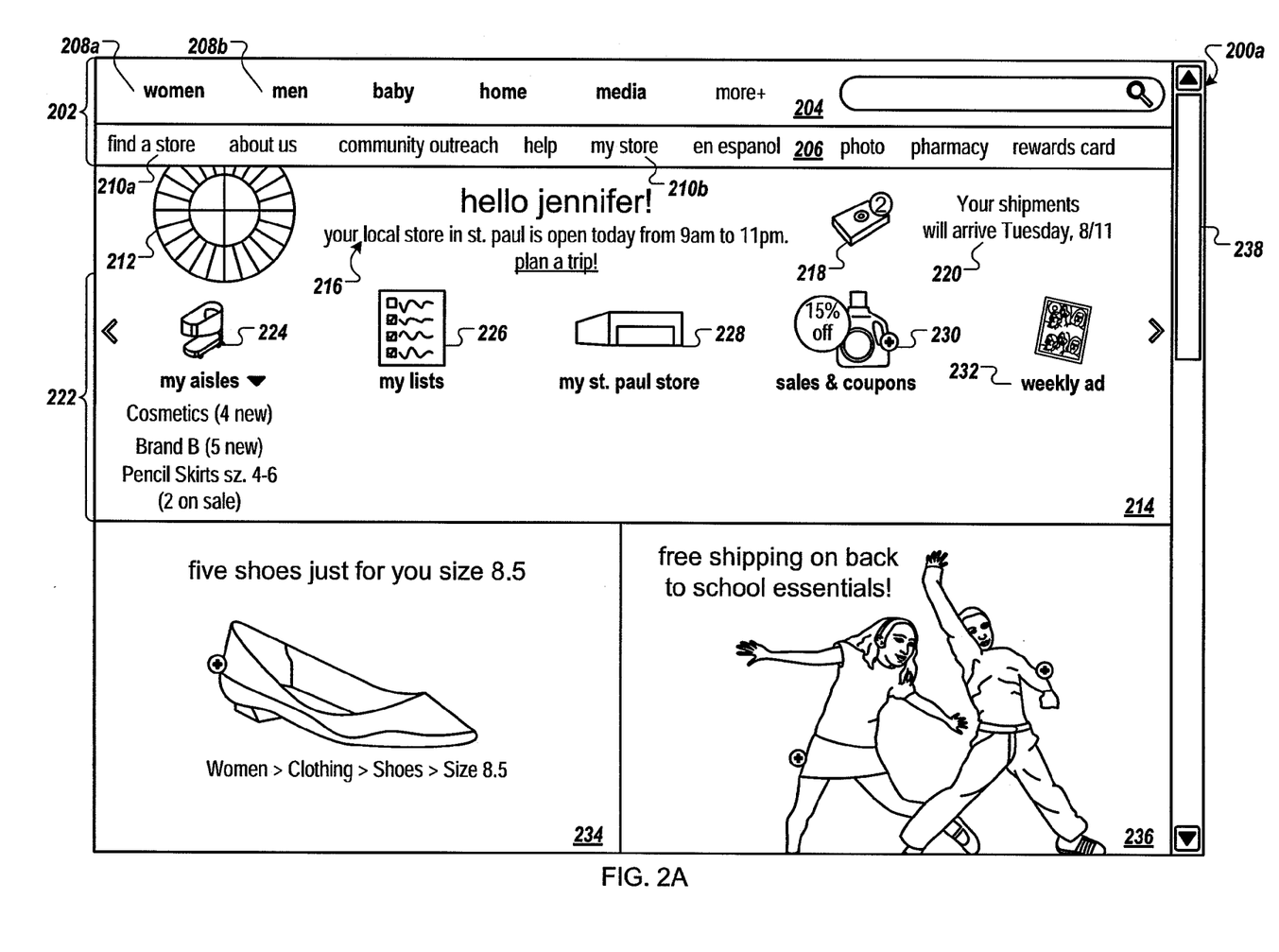
FIGS. 2A-B show an example of a web site home page.

FIG. 2A shows an example of a web site home page 200a. The web site home page 200a presents user specific information. For example, a user creates an account on a web site associated with an e-commerce company. When the user views web pages associated with the web site or the e-commerce company, the user is presented with user specific information. For example, the web page presents product subcategories the user often views, information relating to products recently purchased by the user, or information about a store frequently visited by the user.

The web site home page 200a includes a horizontal navigation bar 202. The horizontal navigation bar 202 includes a main navigation region 204 and a subordinate navigation region 206. The main navigation region 204 includes links to categories of products or services sold by the e-commerce company. For example, the main navigation region 204 includes a "women's department" link 208a and a "men's department" link 208b.

The subordinate navigation region 206 includes links to additional information about the e-commerce company. For example, the subordinate navigation region 206 includes a "find a store" link 210a which allows a user of the web site home page 200a to find a store to purchase products or services from. The subordinate navigation region 206 includes a "my store" link 210b which allows a user to view information about a brick and mortar store (e.g., store hours).

The web site home page 200a includes a company logo 212 associated with the e-commerce company. Alternatively, the company name or a symbol associated with the e-commerce company is presented instead of the company logo 212.

The web site home page 200a includes a user specific notification pane 214. The user specific notification pane 214 includes local store and product shipment information specific to the user viewing the web site home page 200a.

The user specific notification pane 214 includes a personalized message 216. For example, a user creates an account with the e-commerce company and provides information such as home address and preferred retail store. A server (e.g., the server 102) stores the information and provides the personalized message 216 to the user when the user logs on to the web site home page 200a.

The personalized message 216 includes information about the store hours of the retail store. Alternatively, the personalized message 216 includes information about a store close to the user's home address. In some implementations, the personalized message 216 includes a link that allows a user to create a shopping list for products offered at the retail store. For example, selection of the link in the personalized message 216 presents a web page with information about products offered by the retail store (e.g., inventory of specific products) or with promotional information about the retail store.

The user specific notification pane 214 includes information about products recently purchased by a user. For example, the user specific notification pane 214 includes a package icon 218 that indicates the user purchased two products from the e-commerce company and that the two products are currently being shipped to the user. The user specific notification pane 214 includes a delivery date tile 220. The delivery date tile 220 indicates the date that the purchased products will be delivered to the user's address.

In some implementations, the package icon 218 indicates the number of packages being shipped to the user instead of the number of products. In some implementations, the delivery date tile 220 indicates an estimated delivery date.

In some implementations, the horizontal navigation bar 202, the company logo 212, and/or the package icon 218 are displayed on web pages other than a home page. For example, the horizontal navigation bar 202, the company logo 212, and/or the package icon are presented on a search results web page or a product specific web page.

The user specific notification pane 214 includes a user specific information carousel 222. The user specific information carousel 222 allows a user to scroll through different information categories for information relating to the user's account, sales, and a weekly ad. For example, the user specific information carousel 222 includes a "my aisles" tile 224. The "my aisles" tile 224 includes information about product subcategories that the user typically purchases products from. In some implementations, a user specifies the product subcategories that are presented in the "my aisles" tile 224. In some implementations, the "my aisles" tile 224 includes a link to view additional aisles. In some implementations, the "my aisles" tile 224 presents links to product subcategories to a user based on the user's browsing history. For example, a server (e.g., the server 102) analyzes the user's browsing history to determine product subcategories often viewed by the user or related to products purchased by the user and stores identified product subcategory information with the user's account.

The user specific information carousel 222 includes a "my lists" tile 226. The my lists tile 226 allows a user to view wedding registries, wish lists, or shopping lists associated with the user's account. For example, selection of the my lists tile 226 presents a web page with information about wish lists associated with users that are socially connected to the user viewing the web site home page 200a.

The user specific information carousel 222 includes a "my store" tile 228. Selection of the "my store" tile 228 presents information related to the retail store the user typically shops at. In some implementations, the user's account information indicates the retail store the user typically shops at.

The user specific carousel 222 includes a sales and coupons tile 230. The sales and coupons tile 230 provides a user with a link to sale and coupon information related to the user. The sale and coupon information presented to the user is determined based on the user's browsing and purchase history. In some implementations, the user's account information includes information indicating the product categories and subcategories for the sales and coupons to present to the user.

The user specific information carousel 222 includes a weekly ad tile 232. The weekly ad tile 232 provides a link to an electronic copy of a weekly ad published by the e-commerce company. For example, the electronic copy of the weekly ad is a web page that includes an electronic copy of an ad normally published in a printed format. In some implementations, the electronic copy is different than the printed format of the ad.

The web site home page 200a includes a user specific product tile 234. For example, the user specific product tile 234 presents information about a product or product subcategory that a user typically views. In some implementations, the user specific product tile 234 presents information about the same product or product subcategory each time the user views the web site home page 200a. In some implementations, the user specific product tile 234 presents information about different products or product subcategories during different viewing sessions.

The web site home page 200a includes an advertising tile 236 for presentation of information relating to a current sale offered by the e-commerce company. For example, the advertising tile 236 presents information about free shipping for certain back to school products.

Figure 2B:
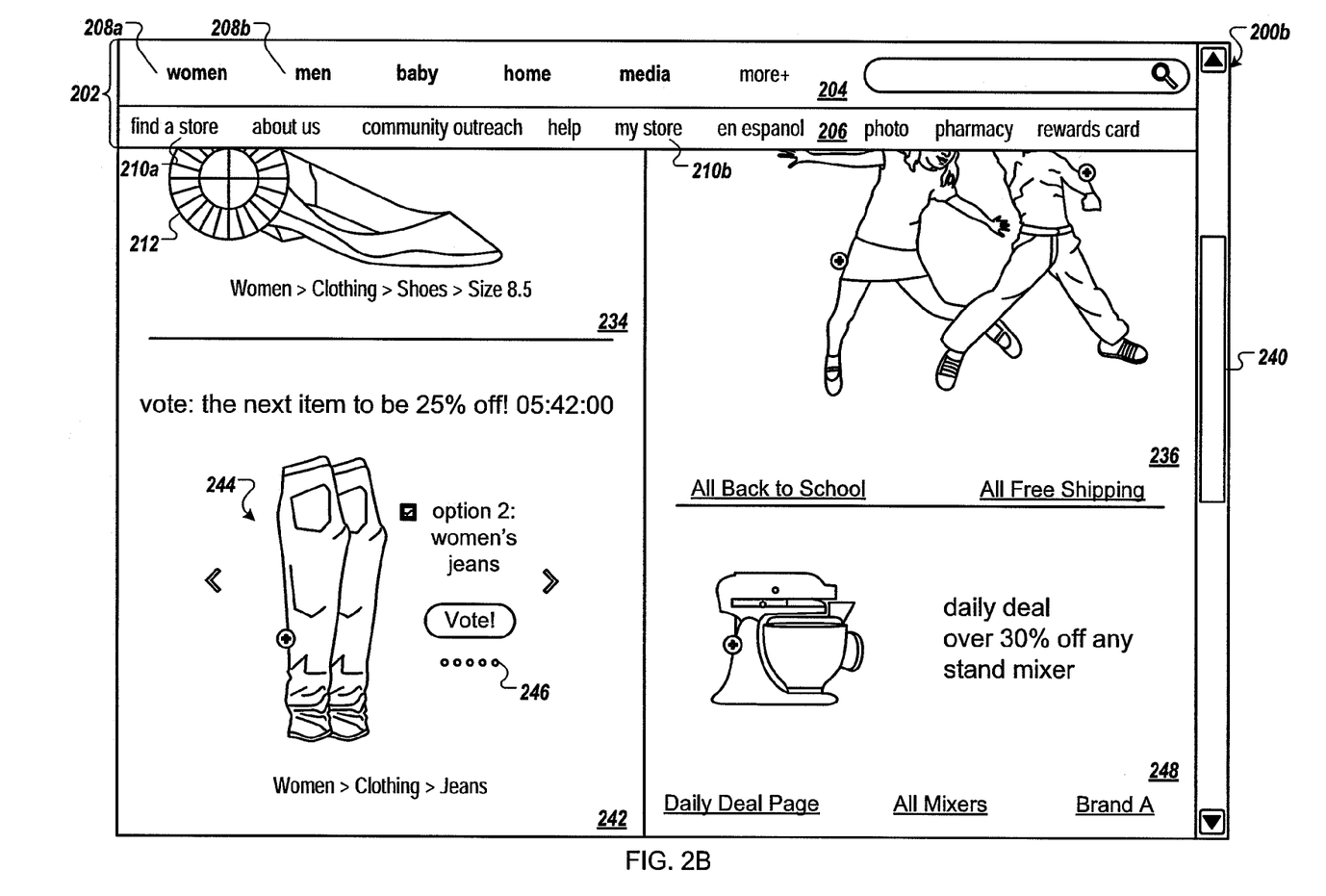

FIG. 2B shows a web site home page 200b scrolled down. For example, the web site home page 200b is the same web page as the web site home page 200a. The web site home page 200b presents content from the web page that existed below a bottom portion of a display (e.g., the display 106) when the web site home page 200a was presented.

The web site home page 200b includes the horizontal navigation bar 202 in the same position as the web site home page 200a. The web site home page 200b includes the company logo 212 in the same position as the web site home page 200a. In some implementations, only the horizontal navigation bar 202 or only the company logo 212 stay in the same position when a user scrolls down the web site home page 200b.

For example, when the web site home page 200a is presented on a display, the scroll bar is in a first position 238, as shown in FIG. 2A. When a browser presenting the web site home page 200a receives input indicating the web page has scrolled down, the web site home page 200b is presented and the scroll bar is in a second position 240, as shown in FIG. 2B. The horizontal navigation bar 202 and the company logo 212 stay in the same position relative to the display as the web page is scrolled down.

Presentation of the horizontal navigation bar 202 in the same position of the display allows a user to easily navigate to other web pages in the web site. Presentation of the company logo 212 in the same position of the display allows a user to easily associate the web page with the e-commerce company.

The web site home page 200b includes a user vote tile 242. The user vote tile 242 allows a user to vote for items to be sold at a discount from the e-commerce company. For example, the user vote tile 242 includes a product carousel 244. A user scrolls through the products presented in the product carousel 244 and selects the product they want to purchase at a discount. In some implementations, the user vote tile 242 includes a user rating selection 246. For example, the user is able to rate the products presented in the product carousel 244.

The web site home page 200b includes a daily deal tile 248. The daily deal tile presents information relating to a special offer provided by the e-commerce company. For example, the daily deal is a discount on a specific product subcategory or a specific brand of product. In some implementations, the daily deal allows a user to purchase services at a discount.

Figure 3:
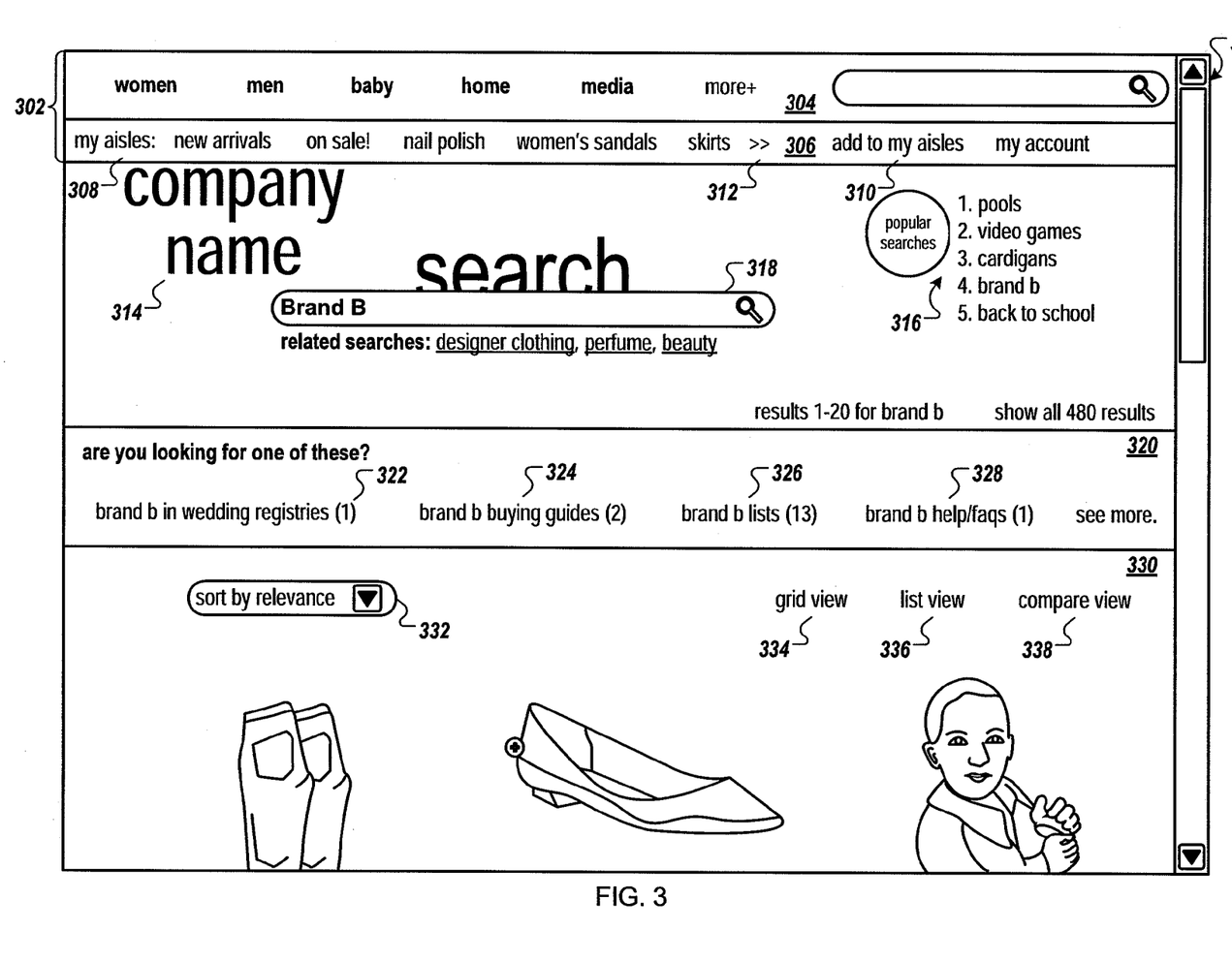
FIG. 3 shows an example of a search results web page.

FIG. 3 shows an example of a search results web page 300. The search results web page 300 presents information about non-product search results in addition to product search results.

The search results web page 300 includes a horizontal navigation bar 302. The horizontal navigation bar 302 includes a main navigation region 304 and a subordinate navigation region 306. The main navigation region 304 includes links to product categories for products sold by an e-commerce company.

The subordinate navigation region 306 includes links to product subcategories. For example, the subordinate navigation region 306 includes a "my aisles" tile 308. The list of subcategories presented in the "my aisles" tile 308 is populated with subcategories by selection of an "add to my aisles" link 310. For example, when a product or product subcategory is presented on the search results web page 300, a browser is able to detect selection of the "add to my aisles" link 310 (e.g., by a user). A server (e.g., the server 102) adds the product subcategory related to the presented product to the my aisles list and the "my aisles" tile 308 includes a link to the product subcategory.

In some implementations, the "my aisles" tile 308 includes a "more" link 312. Selection of the "more" link 312 presents additional product subcategories specified by the user when the "my aisles" tile 308 is not able to present all of the subcategories specified by the user.

In some implementations, a user is able to manually sort the list of subcategories in the "my aisles" tile 308. For example, the user accesses their account settings to view the list of subcategories in their my aisles list. The use moves the subcategories up and/or down the list to determine the location of the subcategory name in the "my aisles" tile 308.

In some implementations, the search results web page 300 includes an image 314 of the e-commerce company name. In some implementations, the horizontal navigation bar 302 and the image 314 stay in the same position relative to a display when the search results web page 300 is scrolled down.

In some implementations, the horizontal navigation bar 302 and/or the image 314 is displayed on web pages other than a search results web page. For example, the horizontal navigation bar 302 and/or the image 314 is presented on a product specific web page or a web page presenting product category or subcategory information.

The search results web page 300 includes a popular searches tile 316. The popular searches tile 316 includes the five search queries most often searched for at the web site. For example, the popular searches tile 316 includes information about the top search queries at the web site during the past week or month. In some implementations, the popular searches tile 316 includes search strings that are popular during a specific season. For example, during the spring, "pools" is a popular search query, but during the winter the same search query is not.

The search results web page 300 includes a search query box 318. The search query box 318 allows a user to enter a product search query for the e-commerce company. In some implementations, the search query box 318 allows a user to search for buying guides, help, FAQs, or other support.

The search results web page 300 includes an alternate results tile 320. For example, the alternate results tile 320 displays links to non-product search results. The alternate results tile 320 includes a "wedding registry" link 322 for wedding registries related to the search query entered in the search query box 318. In some implementations, the "wedding registry" link 322 provides information about wedding registries associated with people socially networked with a user viewing the search results web page 300.

The alternate results tile 320 includes a "buying guides" link 324. The "buying guides" link 324 presents a web page with information relating to buying guides associated with the search query entered in the search query box 318. In some implementations, a search engine (e.g., the search engine 112) receives a search query and determines product results and buying guides associated with the product results. Selection of the "buying guides" link 324 presents information about the buying guides the search engine determined to be associated with the product results.

The alternate results tile 320 includes a "lists" link 326. For example, selection of the "lists" link 326 presents a web page with information about wish lists of people socially connected to a user viewing the search results web page 300. In some implementations, user account information indicates the people that a user is socially connected with.

The alternate results tile 320 includes a "help" link 328. Selection of the "help" link 328 presents a web page with help information and/or FAQs associated with the search query in the search query box 318.

The search results web page 300 includes a product results region 330. The product results region 330 includes thumbnail images of product results and information associated with the product results. For example, the product results region 330 includes the brand, name, price, and/or user rating of the products.

The product results region 330 includes a sort by tile 332. The sort by tile 332 allows a user to sort the products presented in the product results region 330 by relevance, price, user rating, or date (e.g., the date when the product was released).

The product results region 330 includes a grid view button 334, a list view button 336, and a compare view button 338. Selection of the different view buttons 334, 336, or 338 changes the presentation of the product results in the product results region 330.

Figure 4:
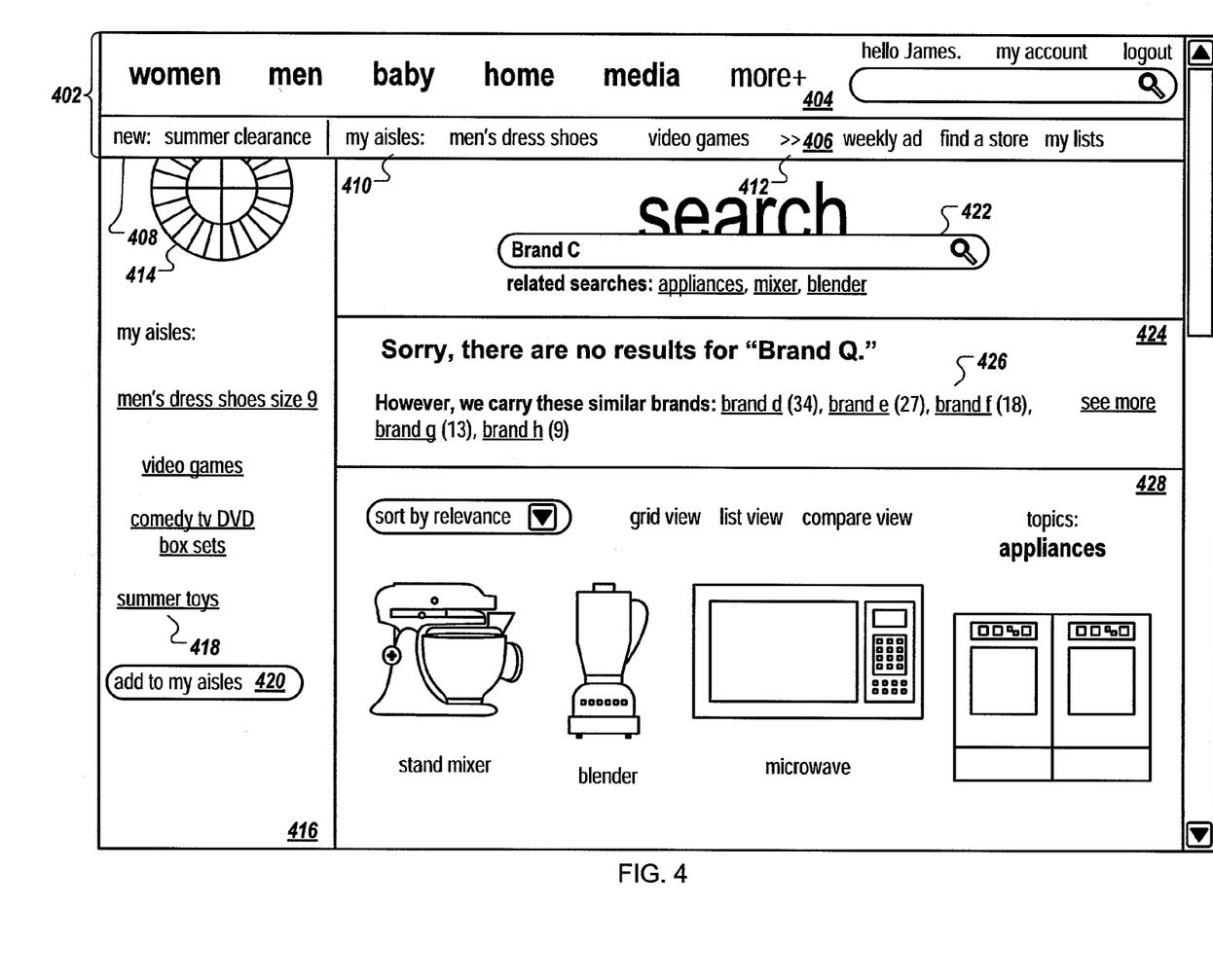
FIG. 4 shows an example of a search results web page with no results found for a user query.

FIG. 4 shows an example of a search results web page 400 with no results found for a user query. The search results web page 400 presents information for related products or services when a search engine does not find any results for the user query.

The search results web page 400 includes a horizontal navigation bar 402. The horizontal navigation bar 402 includes a main navigation region 404. The main navigation region 404 presents links for product categories. In some implementations, the main navigation region 404 includes links for service categories related to services offered by an e-commerce company.

The horizontal navigation bar 402 includes a subordinate navigation region 406. The subordinate navigation region 406 includes links to product subcategories for products offered by the e-commerce company. In some implementations, text in the main navigation region 404 is displayed in a larger font than text in the subordinate navigation region 40.

The subordinate navigation region 406 includes a dynamic links tile 408. The dynamic links tile 408 is dynamically populated with links by a server (e.g., the server 102). In some implementations, the server selects the links based on product or services offered by the e-commerce company. In some implementations, the server selects the links based on sales or industry trends.

The subordinate navigation region 406 includes a my aisles tile 410. The my aisles tile 410 includes links to product subcategories specified by a user. For example, the user creates an account on the web site and specifies the product subcategories in their account settings.

In some implementations, the search results web page 400 includes a maximum number of product subcategories to display. For example, a server includes a threshold value that is the maximum number of product subcategories to include in the search results web page 400. The total number of links to product subcategories presented in the dynamic links tile 408 and the my aisles tile 410 is less than or equal to the threshold value. For example, if the threshold value is five and a user specifies three my aisle subcategories, the dynamic links tile 408 would include two subcategory links.

In another example, the threshold value is three. If a user specifies more than two product subcategories, the my aisles tile 410 includes a "more subcategories" link 412. Selection of the "more subcategories" link 412 presents an overlay on the search results web page 400 with additional dynamic links and my aisle subcategory links.

In some implementations, the threshold value of the maximum number of subcategories to present on the search results web page 400 is determined by the resolution of a display presenting the search results web page 400. For example, a display with a higher resolution (e.g., 1900×1200) presents more product subcategory links than a display with a lower resolution (e.g., 800×600).

The search results web page 400 includes a company logo 414 associated with the e-commerce company. In some implementations, when a user scrolls down the search results web page 400, the company logo 414 stays at the top of a display presenting the search results web page 400. In some implementations, the horizontal navigation bar 402 stays in the same position on a display when a user scrolls down the search results web page 400.

In some implementations, the search results web page 400 includes a vertical navigation bar 416. For example, the vertical navigation bar 416 presents my aisle product subcategories to a user. In some implementations, a user specifies the product subcategories in the user's account settings associated with the search results web page 400. In some implementations, the search results web page 400 is any other type of web page associated with the e-commerce company (e.g., a product web page or a product category browser).

In some implementations, the subcategories in the dynamic links tile 408 are determined based on subcategories presented in the vertical navigation bar 416. For example, the vertical navigation bar 416 includes a "summer toys" link 418 and the dynamic links tile 408 includes a link for summer clearance products.

In some implementations, the dynamic links tile 408 displays notifications to a user. The notifications are for sales or specials that are determined to be relevant to a user based on the subcategories listed in the vertical navigation bar 416.

In some implementations, the vertical navigation bar 416 presents different links based on the time of year. For example, the vertical navigation bar 416 includes the "summer toys" link 418 during the spring but not during the winter.

In some implementations, the subordinate navigation region 406 includes the dynamic links tile 408 and not the my aisles tile 410. For example, the dynamic links tile 408 displays links for four product subcategories. In some implementations, when the subordinate navigation region 406 does not include the my aisles tile 410, the "more subcategories" link 412 presents an overlay on the search results web page 400 with only dynamic links or with both dynamic links and my aisle subcategory links. In some implementations, the subordinate navigation region 406 includes the my aisles tile 410 and not the dynamic links tile 408.

The vertical navigation bar 416 includes an add to my aisles button 420. Selection of the add to my aisles button 420 while viewing a product specific web page adds a link to the product subcategory associated with the product to the vertical navigation bar 416 (or any other my aisles links).

The search results web page 400 includes a search query box 422. The search query box 422 allows a user to search for products or services offered by the e-commerce company. In some implementations, the user searches for specific products or services and views specific web pages related to the products or services. The horizontal navigation bar 402 and the company logo 414 are presented on the different web pages the user views. In some implementations, the horizontal navigation bar 402 and the company logo 414 stay fixed in the same position of a display (e.g., at the top of the display) when the user views the different web pages.

In some implementations, when a search engine (e.g., the search engine 112) determines that there are no results for a search query entered in the search query box, the search results web page 400 includes a no results tile 424. The no results tile 424 presents a message to a user indicating that the search engine did not find any product results. The no results tile includes one or more "related products" links 426 for products or services related to the search query.

For example, a search for a specific brand of product not carried by the e-commerce company results in the search results web page 400 being presented on a display. The search engine determines a product category or subcategory related to the brand and alternate brands with products in the same category or subcategory. The search results web page 400 includes links to one or more search results web pages for the alternate brands in the "related products" links 426.

The search results web page 400 includes a product results tile 428. When the search engine determines that there are no results for a search query entered in the search query box 422, the product results tile 428 presents information related to a product subcategory determined to be related to the search query. The product results tile 428 presents information about products determined by the search engine to be related to the search query.

For example, when the search engine determines that the search query is related to a specific brand, the products results tile 428 displays thumbnail images of products made by similar brands. In another example, when the search engine determines that the search query is related to a specific product category or subcategory, the product results tile 428 displays thumbnail images of products from the product category or subcategory.

Figure 5:
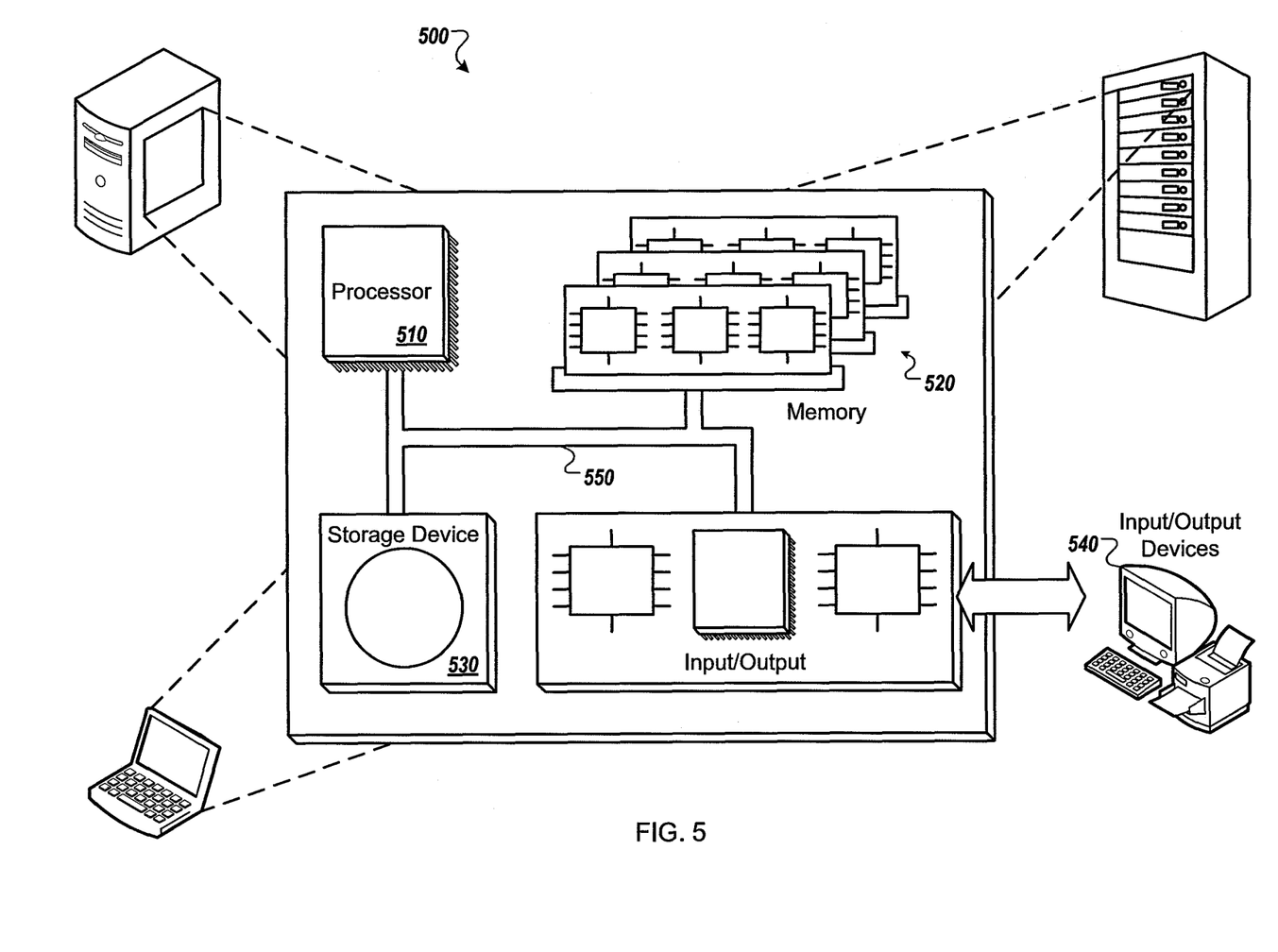
FIG. 5 is a block diagram of a computing system optionally used in connection with computer-implemented methods described in this document.

FIG. 5 is a schematic diagram of a generic computer system 500. The system 500 is optionally used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method for generating a web page comprising the steps of:
   operating one or more computers to generate a web page that is accessible to a user, the web page including:
      a horizontal navigation bar comprising
      a main navigation region displaying product categories that can be selected by the user to navigate to retail product areas, and
      a subordinate navigation region displaying subcategories that the user can select to navigate to sub-regions within the retail product areas, the subordinate navigation region having at least a dynamic links tile and a user specific tile, the subordinate navigation region having a threshold value of a number of links wherein the total number of dynamic links and user specific links does not exceed the threshold value of the number of links, the dynamic links tile is dynamically populated to display in the dynamic links tile one or more links to subcategories by the one or more computers based on at least one of the following criteria: (i) products or services offered by an e-commerce company; (ii) sales; and (iii) industry trends, the user specific tile is populated by the one or more computers with one or more links to subcategories previously specified by the user; and
      an image comprising an enterprise image, logo, or symbol, the image projecting downwardly from the horizontal navigation bar;
      wherein both the horizontal navigation bar and the enterprise image, logo, or symbol are statically positioned as the user scrolls down to web page content existing below a lower boundary of a visible portion of the web page as initially displayed on a communications terminal;
   using the one or more computers, determining whether a user has altered the number of links in the user specific tile such that the total number of links in the subordinate navigation region would exceed the threshold value of the number of links; and,
   in response to determining that a user has altered the number of links in the user specific tile such that the total number of links in the subordinate navigation region would exceed the threshold value of the number of links, automatically altering the number of links in the dynamic links tile to ensure that a total number of links to product subcategories in the subordinate navigation region does not exceed the threshold value of the number of links.

2. The method of claim 1, wherein the web page further comprises a notification pane that includes local store information and product shipment information customized to the user.

3. The method of claim 2, wherein the notification pane includes a carousel that comprises information areas which present information or data customized to the user.

4. The method of claim 3, wherein the carousel includes a tile that provides at least one link to view one or more wedding registries associated with a user account corresponding to the user.

5. The method of claim 4, wherein the wedding registries display desired products of people socially networked with the user.

6. The method of claim 3, wherein the carousel includes a tile that provides at least one link to one or more desired product lists associated with a user account registered to the user.

7. The method of claim 6, wherein the product lists display desired products of people socially networked with the user.

8. The method of claim 3, wherein the carousel includes a tile that provides at least one link to one or more shopping lists associated with a user account registered to the user.

9. The method of claim 3, wherein the carousel includes a tile that provides information about product subcategories from which the user has previously purchased products and a link to one or more pages displaying products within the product subcategories.

10. The method of claim 3, wherein the carousel includes one or more of a local store tile, a sales and coupons tile, and a weekly ad tile.

11. The method of claim 3, wherein the carousel includes two or more of a local store tile, a sales and coupon tile, and a weekly ad tile.

12. The method of claim 1, wherein the subcategories include a reference to a physical store location.

13. The method of claim 1, wherein the subcategories are represented by icons.

14. The method of claim 1, wherein the web page further comprises a suggestions region disposed below a search input region, the suggestions region containing two or more items selected from a group consisting of registries, buying guides, faqs, and lists.

15. The method of claim 14, wherein the lists display desired products of people socially networked with the user.

16. The method of claim 14, wherein the search input region includes one or more suggested alternative searches in response to a search query, the alternative searches being based on one or more factors of industry trend behavior, the factors not including purchasing behavior at the web site.

17. The method of claim 14, wherein the search input region includes product thumbnail arrays or brand specific thumbnail arrays in response to a search query that did not return results.

18. The method of claim 1, wherein the subcategories include links to additional information about an e-commerce company.

19. A system for generating a graphical user interface for a retail environment, said system comprising:
at least one computer for generating a graphical user interface for a retail environment so that a user can access the graphical user interface and conduct an e-commerce session in the retail environment, the graphical user interface including:
a main navigation region displaying a first array of product category links configured upon selection to navigate to corresponding web pages; and
a secondary navigation region, spaced apart from the main navigation region, the secondary navigation region having at least a dynamic links tile having one or more dynamic links and a user specific links tile having one or more user specific links, the secondary navigation region having a threshold value of a number of links wherein the total number of dynamic links and user specific links does not exceed the threshold value of the number of links;
the at least one computer being configured to determine whether a user has altered the number of links in the user specific links tile such that the total number of links in the secondary navigation region would exceed the threshold value of the number of links; and,
the at least one computer being further configured such that in response to determining that a user has altered the number of links in the user specific links tile such that the total number of links in the secondary navigation region would exceed the threshold value of the number of links, the number of links in the dynamic links tile are automatically altered to ensure that a total number of links to product subcategories in the secondary navigation region does not exceed the threshold value of the number of links.

20. The system of claim 19, wherein the secondary navigation region is a vertical navigation bar.

21. The system of claim 19, wherein at least the main navigation region or the secondary navigation region is customized based on purchase history of the user within the retail environment.

22. The system of claim 19, further comprising an image comprising a corporate image, the image projecting downwardly from the main navigation region.

23. The system of claim 22, wherein the image is statically positioned as the user scrolls down on the graphical user interface.

24. A method for generating a graphical user interface for a retail environment, said method comprising the steps of:
providing at least one server for generating a graphical user interface for a retail environment so that a user can access the graphical user interface;
generating a graphical user interface including:
a product display area for displaying a plurality of products offered for sale by a retailer;
a main navigation region displaying a first set of product category links configured upon selection to navigate to corresponding web pages of the retailer; and,
a secondary navigation region having at least a dynamic links tile and a user specific links tile, the secondary navigation region having a threshold value of a number of links wherein the total number of dynamic links and user specific links does not exceed the threshold value of the number of links, the dynamic links tile is dynamically populated to display in the dynamic links tile one or more links to product subcategories by the at least one server based on at least one of the following criteria: (i) products or services offered by an e-commerce company; (ii) sales; and (iii) industry trends, the user specific links tile is populated by the at least one server with one or more links to product subcategories previously specified by the user and, wherein the secondary navigation region is disposed outside of the product display area;
using the at least one server, determining whether a user has altered the number of links in the user specific links tile such that the total number of links in the secondary navigation region would exceed the threshold value of the number of links; and,
in response to the determining that a user has altered the number of links in the user specific links tile such that the total number of links in the secondary navigation region would exceed the threshold value of the number of links, automatically altering the number of links in the dynamic links tile to ensure that a total number of links to product subcategories in the secondary navigation region does not exceed the threshold value of the number of links.

25. The method of claim 24, further including the steps of:
using the at least one server, determining whether a user has altered the number of links in the user specific links tile such that the total number of links in the secondary navigation region would be less than the threshold value of the number of links; and,
in response to the determining that a user has altered the number of links in the user specific links tile such that the total number of links in the secondary navigation region would be less than the threshold value of the number of links, automatically altering the number of links in the dynamic links tile to ensure that a total number of links to product subcategories in the secondary navigation region meets does not exceed the threshold value of the number of links.

* * * * *